Dec. 9, 1969   J. O. BENSON   3,482,992
PROCESS FOR PRODUCING A CEREAL FOOD PRODUCT
Filed Feb. 1, 1965   2 Sheets-Sheet 1
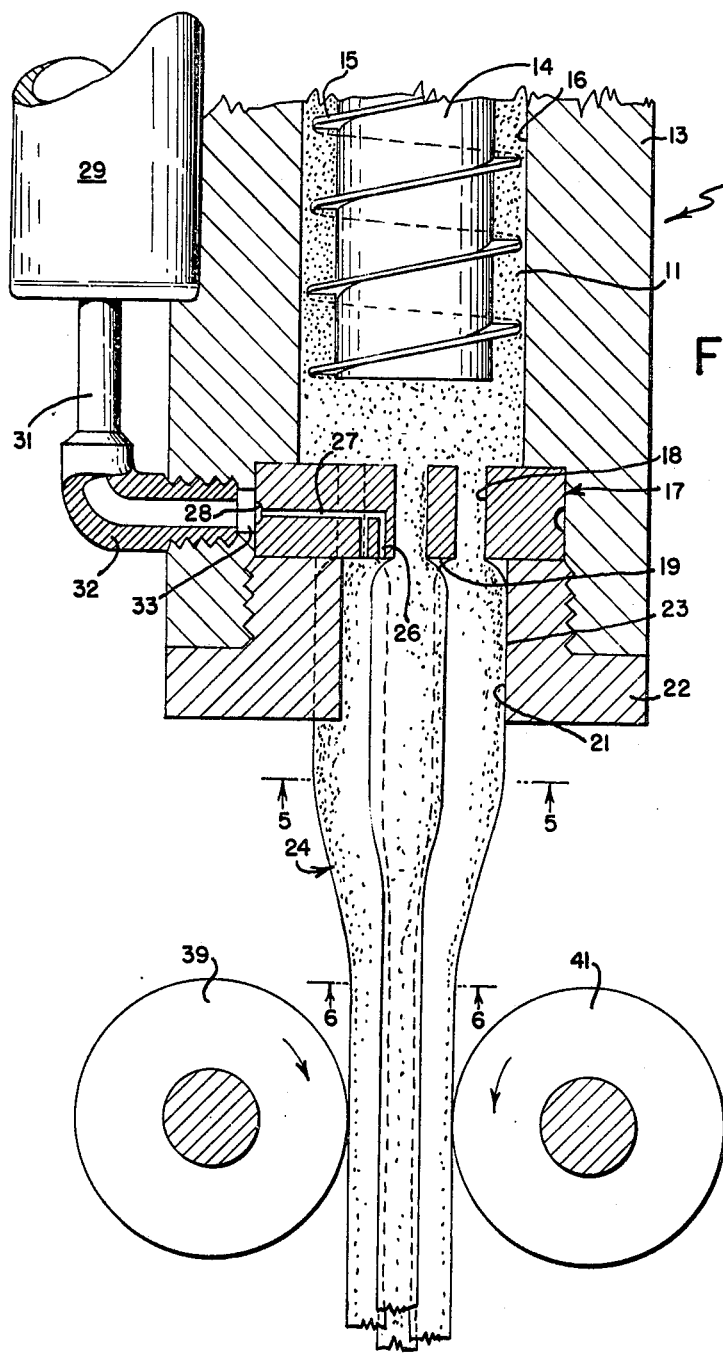
INVENTOR.
JOHN O. BENSON
BY *Harold D. Jastram*
ATTORNEY Dec. 9, 1969   J. O. BENSON   3,482,992
PROCESS FOR PRODUCING A CEREAL FOOD PRODUCT
Filed Feb. 1, 1965   2 Sheets-Sheet 2
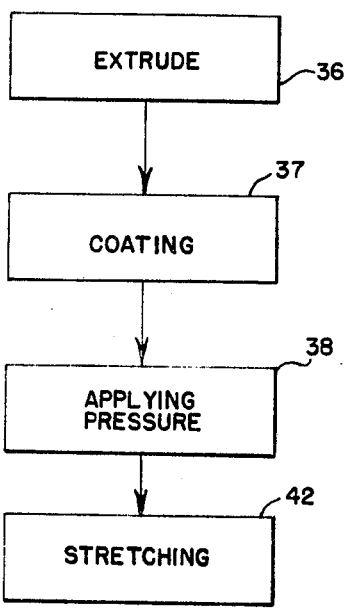
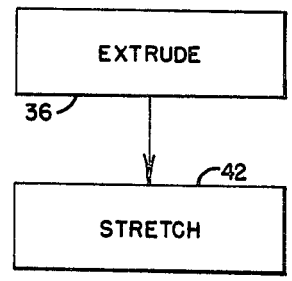
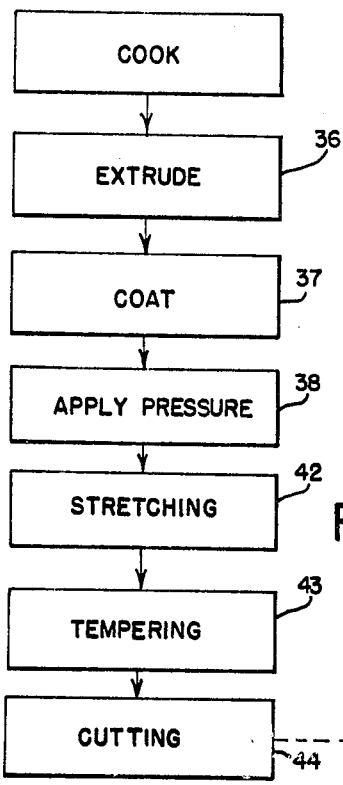
INVENTOR.
JOHN O. BENSON
BY Harold D. Jastram
ATTORNEY United States Patent Office 3,482,992
Patented Dec. 9, 1969

3,482,992
PROCESS FOR PRODUCING A CEREAL
FOOD PRODUCT
John O. Benson, Mayer, Minn., assignor to General Mills,
Inc., a corporation of Delaware
Filed Feb. 1, 1965, Ser. No. 429,268
Int. Cl. A23l 1/10
U.S. Cl. 99—81                                    17 Claims

ABSTRACT OF THE DISCLOSURE

A process for preparing cereal food products by extruding the product, reducing the cross sectional area of the extruded product and cutting the product into pieces of desired shape.

The present invention relates to a cereal food product and more particularly, to a process for producing a cereal food product.

A number of methods are utilized by processors for producing cereal food products such as ready-to-eat cereals and snacks. These methods range from batch methods of preparation to continuous extrusion type methods of preparing the cereal food product. A number of problems arise in these processes when an attempt is made to produce a product having a predetermined cross sectional shape and size or to decorate the resulting product with a decorative food coloring. Formation of a complicated decorative pattern for instance, in a cereal product has presented many problems since the manipulation of the relatively soft pliable dough often results in distortion or destruction of the decorative pattern upon subsequent treatment of the cereal dough product. Formation of such a pattern throughout the section of the product in increasingly difficult when flakes of ready-to-eat cereal or when snacks having novel characteristics are processed on a continuous basis. The rather rough handling of the dough material results in destruction or variation of the pattern when the flakes or snack products are shaped, heated, dried, fried or otherwise processed.

Further, in typical extrusion processes, there are some problems of providing an extrudate which has a small cross section of suitable size for marketing the product and yet which has a reasonable size so that die apertures are large enough to reduce mechanical machining problems when the dies are manufactured. In a typical extrusion process, the larger the opening in the die faces, the smaller the risk of clogging the opening when viscous and partially processed material is forced through the die opening. Also, the introduction of a coloring material or agent into the extrudate must be accomplished with very fine holes in the die in order to furnish sufficiently fine and intricate lines to produce attractive patterns in the extruded dough material. Extremely small holes are subject to clogging and are difficult to machine. Extremely small openings for extrusion of the dough material also result in development of high back pressure in the machine. High back pressure in the pumping system of an extruder results in stresses and strains on the various seals of the machine. High back pressures also require greater strength of the walls of the machine for containing the material. These problems can be overcome by utilizing a large die having relatively large extrusion apertures or apertures provided the resulting product can be reduced to an acceptable size without distortion or destruction of any decorative pattern in the extruded material.

It is therefore an object of the present invention to provide a new and improved process for preparing a cereal food product.

Another object of the present invention is to provide a new and improved process for preparing a cereal food product on a continuous basis by extruding a dough of the product.

A still further object of the present invention is to provide a new and improved process for preparing a cereal food product which has a predetermined cross sectional size and pattern characteristic by extrusion and stretching.

A further object of the present invention is to provide a new and improved process for preparing a cereal food product having a predetermined size and decorative pattern by coating extruded dough during extrusion thereof with a coating agent to form the pattern and stretching the extruded material to reduce the cross sectional area of the extruded dough.

The present invention contemplates a cooked cereal product in the form of a dough. This dough is extruded through a die to form one or more strands or filaments of the extruded dough material. A coloring agent may be used, if desired, to coat the strand during the extrusion thereof to provide a predetermined decorative pattern. If several strands are extruded, the individual strands are forced together so that they cohere and form a sheet or rope of the extruded material having a relatively large cross sectional area. This rope of extruded material is then stretched in order to reduce the cross sectional area of the extruded material to a size acceptable for a food product. The extruded cereal food may then, if desired, be tempered and cut into lengths. These lengths can then be further treated by cooking or puffing.

These and other objects of the present invention will become more apparent with reference to the specification and the drawings in which:

FIGURE 1 is a cross sectional view of an extrusion apparatus and die showing extrusion of a cereal food product and stretching of the extruded product. The cross section is taken along lines 1—1 of FIG. 4, FIGURE 2 is a block diagram illustrating the process for preparing a cereal dough product, FIGURE 2a is a block diagram of a modification of the process illustrated by the block diagram of FIGURE 2, FIGURE 3 is a block diagram of a modification of the process illustrated by the block diagram of FIGURES 2 and 2a.

FIGURE 4 is a top view of a die utilized to prepare a cereal food product having a predetermined decorative pattern, FIGURE 5 is a cross sectional view of an extruded cereal dough product having a predetermined decorative pattern taken along line 5—5 of FIGURE 1, FIGURE 6 is a cross sectional view taken along line 6—6 of FIGURE 1 of a cereal dough product having a predetermined decorative pattern after the dough product has been stretched to reduce the cross sectional area of the extruded product illustrated in FIGURE 1, and FIGURE 7 is a cross sectional view of a puffed cereal dough product made according to the present invention.

Any number of different cereal grains may be treated according to the present process such as, for example, rice, wheat, oats, barley, rye, corn, or any combination of two or more of the above grains. Quite often a cereal product is a combination of some or all of the above grains. Such combinations can be processed according to the present invention with success. The above cereal grains or combination thereof are prepared in a conventional manner for human consumption. For instance, the grains may be ground to a flour-like consistency. This flour may then have a number of ingredients added to the flour such as mineral salts, fiber, or other material for producing a dry mix which will constitute a major portion of the resulting cereal food product.

Moisture is added to the dry cereal mix in order to raise the moisture content by weight to about 22 to about 35%. This dough is then cooked in a conventional cooker to form a cereal food product having the consistency of a dough. Any type of cooker or oven may be utilized to heat the cereal food product to form the dough. In the cooker the dough is cooked for a period of time necessary to at least partially gelatinize the cereal grain. In a steam-type cooker it may take approximately 1 hour of cooking using steam in the cooker jacket.

Refer now to FIGURES 1 and 2 of the drawings. After the cereal food product is formulated and cooked to form a dough, the dough 11 is placed in an extruder generally designated by the numeral 12. This extruder may be any one of several types of extruders. For instance, it may be a worm-type extruder utilizing helical flights to apply pressure to the dough 11 as illustrated in FIGURE 1. The extruder illustrated in FIGURE 1 has a housing 13 into which a worm 14 is fitted in order to apply pressure to the dough 11. The worm 14 forms a relatively close fit within the bore 16 of the extruder housing 13 so that very little of the dough 11 leaks back between the housing well and the flights 15 of worm 14. Pressure is applied to the dough 11 by the worm 14 and forces the dough through a die generally designated by the numeral 17. A specific example of such a die is illustrated further in FIGURE 4 of the drawings. The worm 14 forces the dough 11 through an aperture or a group of apertures 18 in the die 17. While the invention contemplates both single and multi-strand extrusion, the invention will be explained with reference to multi-strand extrusion but the invention is not to be construed as limited thereby. As the dough exits from the front face 19 of the die 17, the dough immediately expands. This expansion forces the dough to completely fill the space within the bore 21 of bushing 22. The bore 21 is made sufficiently small so that as the dough strand or filament 23 expands the individual strands 23 in a multi-strand extrusion are pressed together into a rope or sheet of dough 24. The pressure exerted on the individual strands 23 is sufficient to cause the individual strands to cohere and form a rope 24 which does not fall apart when handled outside the bore 21.

If the extruded strand is a single strand, the strand will have a predetermined cross sectional shape governed by the shape of the aperture 18. The flakes formed from the extruded dough will have a pattern with certain characteristics. For instance, the cross section may have a bubble-like apperance if the dough expands. The pattern may also appear to be a series of bubbles or broken bubbles having a random distribution. If the dough does not expand, the surface of flakes cut from the strand will have a smooth, creamy appearance. In another embodiment of the invention where a decorative pattern is desired the dough 11 is extruded from the die 17, and a coloring agent is applied between the individual strands 23 of dough material thereby forming a decorative pattern in the material. This forms a decorative pattern in the resulting rope or sheet 24 of cereal product. They apertures 26 are provided in the face 19 of the die 17 for discharging the coloring agent directly between the strands 23. The coloring agent is supplied to the apertures 26 by a channel 27 which communicates with an annular groove 28 in the edge of the die 17. A coloring agent is stored in a reservoir 29 and is discharged through a supply line 31 to a fitting 32 which is threaded into a channel 33 in the wall of the extruder 12. The coloring agent moves from the reservoir 29 through the supply channel 31 and fitting 32 into the annular groove 28 and then through the individual channels 27 to the discharge apertures 26. These discharge apertures 26 and then at selected places in the die 17 so that a decorative pattern is formed in the extruded dough. The decorative pattern may be varied by changing the location of the apertures 26 and by changing the location of the extrusion apertures 18.

If the apertures 26 are located as illustrated in FIGURE 4 of the drawings, the resulting product will have a pattern such as that illustrated in FIGURE 5 of the drawings. Lines 34 are lines formed by the coloring agent which coats the individual strands 23 as they are being extruded from the apertures 18. The coating takes place during the expansion of the extruded strand 23. In this way the coloring agent coats the outer surface of each of the filaments 23 in accordance with the location of the apertures 26 thus insuring a formation of a predetermined pattern in the cross section of the rope of cereal food product 24. When the strands 23 are squeezed together and caused to cohere within the bore 21 of the bushing 22, the coloring agent is locked between the strands and thus form a permanent pattern in the cross section of the rope.

It is now noted that the first step of extruding the individual strand or strands 23 has been accomplished. This step is illustrated by block 36 of FIGURES 2 and 2a. Further, the steps of coating and applying pressure to a plurality of strands has been noted and is illustrated by blocks 37 and 38 respectively of FIGURE 2a. (Note also the identical steps illustrated of FIGURE 3.) In order to relieve high back pressure and prevent unnecessary mechanical problems in producing and using the die 17 and the extrusion apparatus 12, the sheet or rope of material 24 was extruded through large aperture or apertures 18 and the coating apertures 26 were made large. The size of the rope 24 resulting from these oversize dies 17 result in an extruded rope 24 of cereal food product having an undesirably large cross sectional area. Accordingly, the cross sectional area of the rope 24 is reduced substantially from the cross sectional area defined by the size of bore 21. This reduction in the cross sectional area of the rope 24 is accomplished by stretching the rope 24 in a direction parallel to the longitudinal axis of the rope 24. This stretching of the rope 24 may be accomplished by simply gripping the end of the material and moving it in an axial direction away from the die 17 at a higher velocity than the material is extruded. A convenient method of accomplishing this stretching is illustrated in FIGURE 1 wherein two power driven wheels 39 and 41 engage the dough rope 24 and move the dough rope in the arrow direction at a velocity greater than the dough is being extruded. The rope 24 might also be laid upon a belt type conveyor which is operated at a sufficiently high speed to stretch the rope 24. Another method accomplishing the stretching is to suspend a portion of the dough rope 24 unsupported as it is discharged from the die 17. Gravitational forces will tend to stretch the rope 24 in substantially the same way that a conveyor stretches the rope. In each case, the extruded dough material demonstrates plastic characteristics and the stretching of the rope 24 causes a reduction of the diameter or cross sectional area of the rope 24. This reduction in cross sectional area can be controlled by the extent of the stretching of the dough. The stretching can be carried out to the point where the dough reaches its elastic limit and therefore breaks or the rope can be reduced very slightly.

One might expect that such stretching and reduction of the cross sectional area of the dough rope 24 might result in a distortion of the intricate patterns formed in the rope 24 by air bubbles, constituent granulation or by the coating of the strands 23 with the coloring agent. This distortion of the pattern characteristics might be expected since there is substantial friction between the bore 21 and the outer surface of the rope 24. Thus it would seem the center material in the rope 24 would move in the arrow direction at a different velocity than the material near the outer surface of the rope 24 which is in contact with the bore 21. One might expect that this friction and difference in the rate of movement of the material making up the rope 24 would result in a distortion of the pattern in the cross section of the rope 24. Investigation has revealed, however, that the figure in the cross section of the rope 24 is not distorted when the overall cross sectional area is reduced by pulling the extruded rope. The result is a continuous method of extruding material and then reducing the cross sectional area of the extruded material to a predetermined size in order to produce a cereal food product having desired size, shape and decorative pattern characteristics for marketing purposes. The step of stretching is illustrated by block 42 of FIGURE 2.

A further embodiment of the above described process is illustrated in FIGURE 3 of the drawings wherein a cereal product is formed into a cereal food product composed of relatively small bits or pieces of the cereal food product similar to flakes. In this embodiment the flour or dry mix of the cereal product is first cooked to form a dough of the material. This dough is then placed in an extruder and the dough is extruded as explained hereinbefore. The decorative pattern is then coated on the individual extruded strands as previously explained so that an acceptable and attractive decorative pattern is formed in the cross section of the extruded rope. This decorative pattern can be any of a variety of patterns which lends marketing appeal to the product. After the decorative pattern is established, pressure is applied to the individual strands to press the strands together so that they cohere and form a single bundle of strands. The rope which results from coherence of the individual strands is then stretched to reduce the cross sectional area of the rope to a size which is desired in the finished product. These steps have been heretofore explained.

In order to facilitate further handling and cutting of the rope into small pieces, the rope is next tempered for a time after the stretching has been completed. Cooking the dough raises the temperature of the dough to relatively high temperatures with the result that the extruded dough is relatively difficult to handle. The stretched rope of dough is tempered (see numeral 43 in FIGURE 3) by placing the dough on a conveyor belt or on a reel where it is permitted to cool at ambient room temperatures. It has been found that the rope of dough can be successfully cooled in this manner from about the ambient temperature to about 225° F. The tempering of the extruded dough permits the dough to cool sufficiently to develop greater tensile strength and resistance to physical distortions when the material is being handled. This hardening is brought about by cooling of the thermoplastic dough and perhaps by crystallization of the sugars in the product. The tempering also insures uniform distribution of moisture throughout the cross section of the dough rope. Fans can be utilized to direct air over the material as it lays upon a belt or reel. There are a number of other ways that the material may be tempered, however. One of these might include cooling with insert gases such as nitrogen or the like. The cooling medium could be cooled if desired rather than utilizing the cooling medium at ambient temperatures. It has been found that tempering usually slightly reduces the moisture content of the tempered dough so that it contains from about 20 to about 28% moisture by weight.

After the tempering has been completed, the rope is cut into pieces of predetermined shape desired for marketing the product (see numeral 44 of FIGURE 3). The rope may be cut into length so that the rope resembles a large piece of spaghetti. The rope may be cut in thin slices so the resulting pieces have the appearance of chips. In a preferred embodiment of this invention the rope 24 is sliced into thin slices resembling chips so that a chip-type snack product can be manufactured. In this embodiment, the dough is severed perpendicular to the direction of flow of the rope illustrated in FIGURE 1. When the rope is cut in this manner, the resulting pattern in the cut flake is illustrated in FIGURE 6 of the drawings. This is the pattern which results from the use of a die such as that illustrated in FIGURE 4 of the drawings. This pattern as noted can be varied according to the decorative pattern desired. Further, the dough rope could, if desired, be cut at other than right angles to the longitudinal axis of the rope thus varying the resulting pattern of the severed chip. However, the pattern illustrated in FIGURE 6 which is produced from the perpendicular cutting of the tempered dough has been found to be an attractive decorative pattern. The cutting may be accomplished by any number of cutting means such as a guillotine cutter or a rotary cutter. Whichever type of cutter might be utilized, the dough should be severed so that the resulting pattern is clear and crisp and does not contain smear marks.

Next the severed pieces are dried (see numeral 45 of FIGURE 3). The drying may be carried out in a number of devices. One device which has been found to be particularly successful is a drum type drier having a helix within the drier so that the pieces of dough are agitated while they are being subjected to a drying medium such as heated air. The drum is normally rotated in such a device and the helix within the drum conveys the pieces from the input end of the drum to the exit thereof. The drying should take place rather slowly so that simple surface drying does not result. The outer surface of the flake should not be substantially drier or have substantially less moisture than the inner portion of the flake. In other words, the moisture distribution of the flake should be uniform. Preferably, the moisture content of the individual pieces is reduced from about 6 to about 14% by weight. This will produce a product which can be successfully cooked or puffed if desired. Preferably the moisture content is about 8 to about 10% by weight.

Finally, the dried cereal dough product is cooked. Preferably the dough pieces are puffed (see numeral 46 of FIGURE 3) in order to produce a crisp tender cereal product having superior taste qualities and flavor characteristics. The puffing may be carried out by simply fat frying the dried pieces of material. The resulting puffed product will contain a relatively high concentration of fat. If a less fatty product is desired, the puffing may be carried out by subjecting the dried pieces to a hot granular heat transfer medium. Contact with such a heat transfer medium will result in puffing of the dried pieces to produce a crisp product having a relatively low fat content. The temperature of the frying fat or the granular dry heat transfer medium should be sufficiently high to insure a uniform puff of the product without burning. The puffed product is illustrated in FIGURE 7 of the drawings wherein it will be noted that the product puffs and retains the decorative pattern achieved in the extruded dough illustrated in FIGURES 5 and 6. This decorative pattern remains in the puffed product due to the fact that the decorative pattern is essentially locked in the dough rope as it is being extruded. The pattern is securely locked in the cross section of the rope when the individual filaments or strands are forced to cohere.

At this point it should be noted that the invention is applicable of a variety of cooked cereal doughs and such doughs embrace derivations from wheat, corn, oats, barley, rye, rice and the like. Further, the doughs may be produced from a single grain or from mixtures thereof, and the invention particularly concerns doughs derived from a selected grain together with the addition of other ingredients for the purpose of improving puffability of the product, flavor, texture, and overall eating quality. An example of one type of product which can be prepared according to the teachings of the invention is illustrated in the following examples.

EXAMPLE I

Yellow corn cones ground to a flour-like consistency was mixed with sugar and salt so that the resulting mixture contains about 87% yellow corn cones, a sugar concentration of about 9.7% and a salt concentration of about 3.3%. Sufficient water was added to bring the moisture content of the resulting mixture to about 22 to about 35% by weight. This moistened mixture was placed in a cooker where the mixture was cooked to form a cooked dough. The cooked dough was then fed to an extruder where it was extruded through a die similar to that illustrated in FIGURE 4 of the drawings. The extruded strands were coated with F D & C red dye No. 2. The strands were forced together immediately after coating so that the strands cohered and locked the decorative pattern in the cross section of the extruded rope of dough. The resulting extruded rope was then stretched so that the rope which was substantially circular in cross section was reduced in cross section from about 5/8″ to diameter to about 5/16″ diameter. The result was a cereal food product containing a decorative pattern in the cross section thereof and having a predetermined cross section size.

EXAMPLE II

In a second example, yellow ground corn cones were mixed with oat flour and rice flour. These dry ingredients were then mixed with sugar, wheat starch and salt to produce a complete dry mix containing the following concentrations of ingredients:

| Ingredients: | Percentages |
| --- | --- |
| Yellow corn cones | 70 |
| Oat flour | 8.8 |
| Rice | 8.8 |
| Sugar | 5.3 |
| Wheat starch | 4.1 |
| Salt | 3.0 |
| | 100.0 |

This dry mix was fed together with water to a continuous cooker. Enough water was added to the dry mix to raise the moisture content of the mixture to about 22 to about 35% by weight. The dough was then cooked and processed as explained in Example I. After the stretching was accomplished, the extruded rope of dough was permitted to cool or temper. The dough was cooled to about room temperature. After the dough was tempered for a sufficient period to permit the dough to harden, the dough was fed to a cutter which sliced the rope of dough perpendicular to the longitudinal axis of the dough thus producing thin slices of dough. These thin slices of dough were then dried to a moisture content of about 8 to about 10% by weight. The drying was accomplished relatively slowly in order to permit the individual flakes to develop a uniform concentration of the remaining moisture throughout the individual slices. Finally the dried pieces were puffed in a deep fat fryer type cooker. The pieces puffed and produced a product resembling the product illustrated in FIGURE 7 of the drawings.

It is to be understood that the above described process and the above examples are simply illustrative of the application of principles of the invention and many other modifications may be made without departing from the spirit and scope of the invention.

The embodiments of the invention in which an exclusive property or privilege is claimed are defined as follows:

1. A process of continuously preparing a cereal food product which comprises the steps of extruding a dough material into a bundle of strands, coating the strands with a coloring agent during the extrusion thereof to provide a predetermined decorative pattern, applying pressure to the strands to cause the strands to cohere while maintaining the individual strand identity, stretching the bundle along the longitudinal axis to reduce the cross sectional area of the bundle while preserving said decorative pattern and cutting said bundle to the desired thickness whereby each strand maintains its separate identity.

2. A process of continuously preparing a cereal food product which comprises the steps of cooking the cereal food product to form a dough material, extruding a dough material into a bundle of strands, coating the strands with a coloring agent during the extrusion thereof to provide a predetermined decorative pattern, applying pressure to the filaments to cause the strands to cohere while maintaining the individual strand identity, stretching the bundle along the longitudinal axis to reduce the cross sectional area of the bundle while preserving said decorative pattern, tempering the bundle to reduce the temperature of the material and to harden the material and then cutting the bundle into pieces of the desired thickness whereby each strand maintains its separate identity.

3. A process in accordance with claim 2 in which the bundle is cut perpendicular to the longitudinal axis of the bundle.

4. A process in accordance with claim 2 in which the cereal food product is corn.

5. A process in accordance with claim 2 in which the cereal food product is corn and rye.

6. A process in accordance with claim 2 in which the cereal food product is oats.

7. A process in accordance with claim 2 in which the cereal food product is rice.

8. A process in accordance with claim 2 in which the cereal food product is wheat.

9. A process in accordance with claim 2 in which the bundle is tempered for a sufficient length of time to permit the material to cool from ambient air temperatures to about 225° F. in ambient air.

10. A process in accordance with claim 2 which further includes the step of drying the cut pieces.

11. A process of continuously preparing a cereal food product which comprises the steps of cooking the cereal food product having moisture content of about 22 to about 35% by weight to produce a dough material, extruding the dough material into a bundle of strands, coating the strands with a coloring agent during the extrusion thereof to provide a predetermined decorative pattern, applying pressure to the strands to cause the strands to cohere while maintaining the individual strand identity, stretching the bundle along the longitudinal axis to reduce the cross sectional area of the bundle while preserving said decorative pattern, tempering the bundle to reduce the temperature of the material and to harden the material, cutting the bundle into pieces of the desired thickness whereby each strand maintains its separate identity and then drying the pieces.

12. A process in accordance with claim 11 in which the pieces are dried to a moisture content of about 6 to about 14% by weight.

13. A process in accordance with claim 11 in which the pieces are dried to a moisture content of about 8 to about 10% by weight.

14. A process of continuously preparing a cereal food product which comprises the steps of cooking the cereal food product having moisture content of about 22 to about 35% by weight to produce a dough material, extruding the dough material into a bundle of strands, coating the strand with a coloring agent during the extrusion thereof to provide a predetermined decorative pattern, applying pressure to the strands to cause the strand to cohere while maintaining the individual strands' identity, stretching the bundle along the longitudinal axis to reduce the cross sectional area of the bundle while preserving said decorative pattern, tempering the bundle to reduce the temperature of the material and to harden the material, cutting the bundle into pieces to the desired thickness whereby each strand maintains its separate identity and then puffing the dried pieces.

15. A process in accordance with claim 14 in which the puffing is carried out by subjecting the pieces to a dry granular heat transfer medium.

16. A process in accordance with claim 14 in which the puffing is carried out by frying the pieces in cooking oil.

17. A process of continuously preparing a cereal food product which comprises the steps of cooking a cereal dough having a moisture content of about 22 to about 35% by weight to produce a dough material, extruding the dough into a bundle of strands, coating the strands with a coloring agent during the extrusion thereof to provide a predetermined decorative pattern, applying pressure to the strands to cause the strands to cohere while maintaining the individuals strands' identity, stretching the bundle along the longitudinal axis to reduce the cross sectional area of the bundle while preserving said decorative pattern, tempering the bundle in ambient air to reduce the temperature from about ambient temperatures to about 225° F. and to harden the material, cutting the bundle perpendicular to the longitudinal axis to form slices of the desired thickness whereby each strand maintains its separate identity, drying the slices to a moisture content of about 6 to about 14% by weight, and then puffing the dried slices.

References Cited

UNITED STATES PATENTS

| | | | |
|---|---|---|---|
| 1,925,267 | 9/1933 | McKay | 99—81 |
| 2,858,217 | 10/1958 | Benson | 99—80 |
| 3,190,755 | 6/1965 | Peden | 99—81 |
| 3,253,533 | 5/1966 | Benson | 99—81 XR |
| 3,332,781 | 7/1967 | Benson et al. | 99—81 |

RAYMOND N. JONES, Primary Examiner

U.S. Cl. X.R.

99—80, 83